US010454925B2

(12) United States Patent
Hamasaki et al.

(10) Patent No.: US 10,454,925 B2
(45) Date of Patent: Oct. 22, 2019

(54) PORTABLE TERMINAL AND METHOD OF CONTROLLING LOCKING OF PORTABLE TERMINAL

(71) Applicant: KYOCERA CORPORATION, Kyoto (JP)

(72) Inventors: Masamitsu Hamasaki, Yokohama (JP); Tatsuhiko Abe, Higashiosaka (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/499,735

(22) Filed: Apr. 27, 2017

(65) Prior Publication Data

US 2017/0230358 A1    Aug. 10, 2017

Related U.S. Application Data

(63) Continuation of application No. PCT/JP2015/080596, filed on Oct. 29, 2015.

(30) Foreign Application Priority Data

Oct. 29, 2014    (JP) ................. 2014-220184

(51) Int. Cl.
| | |
|---|---|
| *H04W 4/80* | (2018.01) |
| *H04W 92/08* | (2009.01) |
| *H04W 92/18* | (2009.01) |
| *H04L 29/06* | (2006.01) |
| *G06F 21/31* | (2013.01) |
| *H04M 1/66* | (2006.01) |

(Continued)

(52) U.S. Cl.
CPC .......... *H04L 63/0853* (2013.01); *G06F 21/31* (2013.01); *H04L 63/083* (2013.01); *H04L 63/102* (2013.01); *H04L 63/105* (2013.01); *H04L 63/107* (2013.01); *H04M 1/66* (2013.01); *H04M 1/67* (2013.01); *H04M 1/673* (2013.01); *H04M 1/7253* (2013.01); *H04W 4/80* (2018.02); *H04W 12/06* (2013.01); *H04W 12/08* (2013.01); *H04W 92/08* (2013.01); *H04W 92/18* (2013.01)

(58) Field of Classification Search
CPC ....... H04W 4/00; H04W 4/005; H04W 4/006; H04W 4/008; H04W 76/043; H04W 84/00; H04W 84/18; H04W 84/20; H04W 88/00; H04W 88/02; H04W 92/16; H04W 92/18
See application file for complete search history.

(56) References Cited

U.S. PATENT DOCUMENTS

| | | | | |
|---|---|---|---|---|
| 7,375,730 B2 * | 5/2008 | Tagliabue | ......... | H04M 1/27455 345/440 |
| 2009/0149156 A1 * | 6/2009 | Yeo | ..................... | G06F 3/04883 455/411 |

(Continued)

FOREIGN PATENT DOCUMENTS

| | | |
|---|---|---|
| JP | 2013-187879 | 9/2013 |
| JP | 2014110638 A | 6/2014 |
| JP | 2016086390 A | 5/2016 |

*Primary Examiner* — San Htun
(74) *Attorney, Agent, or Firm* — Duane Morris LLP

(57) ABSTRACT

At least one processor controls unlocking based on received acceleration data and data representing a position on a touch panel where proximity or contact of an object is detected when a near field communicator receives acceleration data output from an acceleration sensor of a wearable terminal while locking has been set.

14 Claims, 15 Drawing Sheets

(51) Int. Cl.
  *H04M 1/67* (2006.01)
  *H04M 1/673* (2006.01)
  *H04W 12/06* (2009.01)
  *H04W 12/08* (2009.01)
  *H04M 1/725* (2006.01)

(56) References Cited

U.S. PATENT DOCUMENTS

| | | | |
|---|---|---|---|
| 2009/0241072 A1* | 9/2009 | Chaudhri | G06F 3/04883 |
| | | | 715/863 |
| 2009/0284482 A1* | 11/2009 | Chin | G06F 3/04883 |
| | | | 345/173 |
| 2011/0247065 A1* | 10/2011 | Melnyk | G06F 3/04883 |
| | | | 726/16 |
| 2012/0064951 A1* | 3/2012 | Agevik | G06F 3/012 |
| | | | 455/569.1 |
| 2013/0024932 A1* | 1/2013 | Toebes | G06F 21/31 |
| | | | 726/19 |
| 2014/0155031 A1* | 6/2014 | Lee | G06F 21/35 |
| | | | 455/411 |
| 2015/0031333 A1* | 1/2015 | Lee | H04B 1/385 |
| | | | 455/411 |
| 2015/0135284 A1* | 5/2015 | Bogard | G06F 21/35 |
| | | | 726/5 |
| 2017/0230358 A1 | 8/2017 | Hamasaki et al. | |

* cited by examiner

FIG.9

| FIRST UNLOCKING SCHEME | SLIDE OPERATION |
|---|---|
| SECOND UNLOCKING SCHEME | PATTERN INPUT OPERATION |

FIG.10

| FIRST UNLOCKING SCHEME | SHOW SCREEN BEFORE LOCKING |
|---|---|
| SECOND UNLOCKING SCHEME | SHOW HOME SCREEN |

FIG.14A

| FIRST UNLOCKING SCHEME | SLIDE OPERATION |
|---|---|
| SECOND UNLOCKING SCHEME | LOCK No. INPUT OPERATION |

FIG.14B

| FIRST UNLOCKING SCHEME | SLIDE OPERATION |
|---|---|
| SECOND UNLOCKING SCHEME | PASSWORD INPUT OPERATION |

FIG.14C

| FIRST UNLOCKING SCHEME | LOCK No. INPUT OPERATION |
|---|---|
| SECOND UNLOCKING SCHEME | PATTERN INPUT OPERATION |

FIG.14D

| FIRST UNLOCKING SCHEME | LOCK No. INPUT OPERATION |
|---|---|
| SECOND UNLOCKING SCHEME | PASSWORD INPUT OPERATION |

FIG.14E

| FIRST UNLOCKING SCHEME | PATTERN INPUT OPERATION |
|---|---|
| SECOND UNLOCKING SCHEME | PASSWORD INPUT OPERATION |

FIG.14F

| FIRST UNLOCKING SCHEME | SLIDE OPERATION |
|---|---|
| SECOND UNLOCKING SCHEME | SLIDE OPERATION + LOCK No. INPUT OPERATION |

FIG.14G

| FIRST UNLOCKING SCHEME | SLIDE OPERATION |
|---|---|
| SECOND UNLOCKING SCHEME | SLIDE OPERATION + PATTERN INPUT OPERATION |

FIG.14H

| FIRST UNLOCKING SCHEME | SLIDE OPERATION |
|---|---|
| SECOND UNLOCKING SCHEME | SLIDE OPERATION + PASSWORD INPUT OPERATION |

FIG.14I

| FIRST UNLOCKING SCHEME | LOCK No. INPUT OPERATION |
|---|---|
| SECOND UNLOCKING SCHEME | LOCK No. INPUT OPERATION + PATTERN INPUT OPERATION |

FIG.14J

| FIRST UNLOCKING SCHEME | LOCK No. INPUT OPERATION |
|---|---|
| SECOND UNLOCKING SCHEME | LOCK No. INPUT OPERATION + PASSWORD INPUT OPERATION |

FIG.14K

| FIRST UNLOCKING SCHEME | PATTERN INPUT OPERATION |
|---|---|
| SECOND UNLOCKING SCHEME | PATTERN INPUT OPERATION + PASSWORD INPUT OPERATION |

FIG.15A

| FIRST UNLOCKING SCHEME | SHOW SCREEN HIGHEST IN FREQUENCY OF USE |
|---|---|
| SECOND UNLOCKING SCHEME | SHOW HOME SCREEN |

FIG.15B

| FIRST UNLOCKING SCHEME | SHOW SCREEN ASSOCIATED WITH EVENT |
|---|---|
| SECOND UNLOCKING SCHEME | SHOW HOME SCREEN |

FIG.15C

| FIRST UNLOCKING SCHEME | SHOW SCREEN HIGHEST IN PRIORITY AMONG EVENTS |
|---|---|
| SECOND UNLOCKING SCHEME | SHOW HOME SCREEN |

FIG.15D

| FIRST UNLOCKING SCHEME | SHOW SCREEN EARLIEST AMONG EVENTS |
|---|---|
| SECOND UNLOCKING SCHEME | SHOW HOME SCREEN |

FIG.15E

| FIRST UNLOCKING SCHEME | SHOW SCREEN LAST AMONG EVENTS |
|---|---|
| SECOND UNLOCKING SCHEME | SHOW HOME SCREEN |

FIG.15F

| FIRST UNLOCKING SCHEME | SHOW SCREEN HIGHEST IN FREQUENCY OF USE |
|---|---|
| SECOND UNLOCKING SCHEME | SHOW SCREEN BEFORE LOCKING |

FIG.15G

| FIRST UNLOCKING SCHEME | SHOW SCREEN ASSOCIATED WITH EVENT |
|---|---|
| SECOND UNLOCKING SCHEME | SHOW SCREEN BEFORE LOCKING |

FIG.15H

| FIRST UNLOCKING SCHEME | SHOW SCREEN HIGHEST IN PRIORITY AMONG EVENTS |
|---|---|
| SECOND UNLOCKING SCHEME | SHOW SCREEN BEFORE LOCKING |

FIG.15I

| FIRST UNLOCKING SCHEME | SHOW SCREEN EARLIEST AMONG EVENTS |
|---|---|
| SECOND UNLOCKING SCHEME | SHOW SCREEN BEFORE LOCKING |

FIG.15J

| FIRST UNLOCKING SCHEME | SHOW SCREEN LAST AMONG EVENTS |
|---|---|
| SECOND UNLOCKING SCHEME | SHOW SCREEN BEFORE LOCKING |

ND METHOD OF
PORTABLE TERMINAL AND METHOD OF CONTROLLING LOCKING OF PORTABLE TERMINAL

CROSS-REFERENCE TO RELATED APPLICATION

The present application is a continuation based on PCT Application No. PCT/JP2015/080596 filed on Oct. 29, 2015, which claims the benefit of Japanese Application No. 2014-220184 filed on Oct. 29, 2014. PCT Application No. PCT/JP2015/080596 is entitled "Mobile Terminal and Lock Control Method for Mobile Terminal," and Japanese Application No. 2014-220184 is entitled "Portable Terminal and Method of Controlling Locking of Portable Terminal." The content of which is incorporated by reference herein in their entirety.

FIELD

The present disclosure relates to a portable terminal and a method of controlling locking of a portable terminal.

BACKGROUND

For example, a portable terminal representing one example of the background art establishes near field communication with an authentication information recording medium attached to a watch possessed by a user when a condition for performing specific processing specified in correspondence with an input from a user is satisfied in a locked state in which execution of the specific processing is prohibited. The portable terminal obtains ID information recorded in the authentication information recording medium and is unlocked when the ID information is successfully authenticated.

SUMMARY

A portable terminal in one embodiment is a portable terminal capable of communicating with a wearable terminal. The wearable terminal can transmit data showing movement of the wearable terminal to the portable terminal. The portable terminal includes a communicator, at least one processor, and a touch panel. The communicator is configured to communicate with the wearable terminal. At least one processor is configured to set and cancel locking. The touch panel is configured to detect proximity or contact of an object. The communicator can receive the data showing movement of the wearable terminal from the wearable terminal. At least one processor is configured to control unlocking based on the data showing movement of the wearable terminal and data representing a position on the touch panel where proximity or contact has been detected when the communicator receives the data showing movement of the wearable terminal while locking has been set.

BRIEF DESCRIPTION OF THE DRAWINGS

FIG. 9 is a diagram showing an exemplary combination of a first unlocking scheme and a second unlocking scheme in a second embodiment.

FIG. 10 is a diagram showing an exemplary combination of a screen shown after unlocking under the first unlocking scheme and a screen shown after unlocking under the second unlocking scheme in the second embodiment.

FIGS. 14A to 14K are diagrams showing modifications of the combination of the first unlocking scheme and the second unlocking scheme.

FIGS. 15A to 15J are diagrams showing modifications of the combination of the screen shown after unlocking under the first unlocking scheme and the screen shown after unlocking under the second unlocking scheme.

DETAILED DESCRIPTION

An embodiment will be described below with reference to the drawings.

In an unlocking method in one example of the background art, for example, when an authorized user wears a watch to which an authentication information recording medium is attached and the user is present around a portable terminal without holding the portable terminal, the portable terminal is unlocked. In such a case, a third party who is present around the portable terminal can operate the unlocked portable terminal without permission, which poses a security problem. Such a problem can be solved by the disclosure below.

First Embodiment

Figure 1:
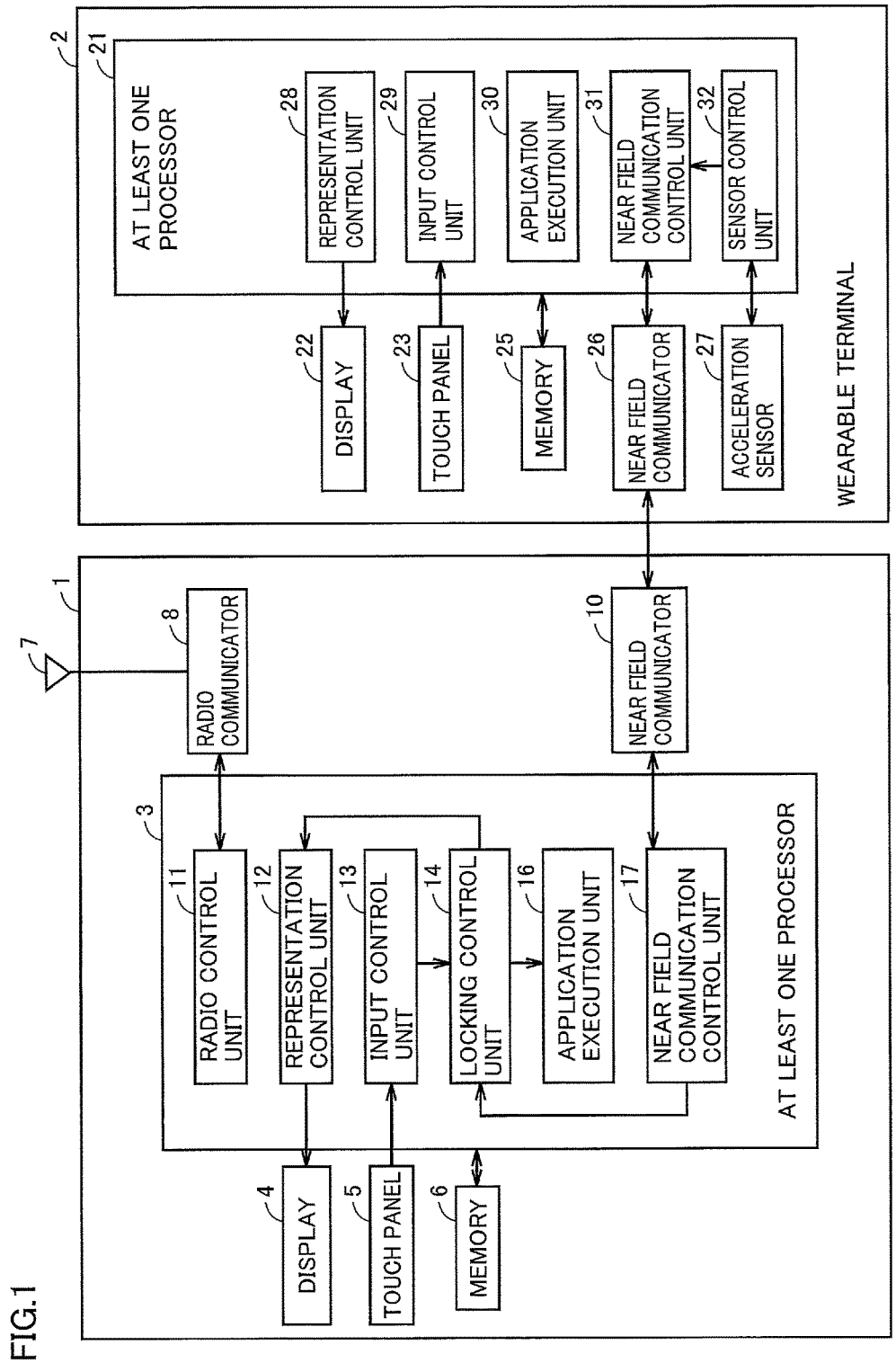
FIG. 1 is a diagram showing an electronic system including a portable terminal and a wearable terminal in an embodiment.

FIG. 1 is a diagram showing an electronic system including a portable terminal 1 and a wearable terminal 2 in an embodiment.

Wearable terminal 2 is a ring type device attached to a finger of a user. Wearable terminal 2 includes at least one processor 21, a display 22, a touch panel 23, a memory 25, a near field communicator 26, and an acceleration sensor 27. At least one processor 21 functions as a representation control unit 28, an input control unit 29, an application execution unit 30, a near field communication control unit 31, and a sensor control unit 32.

In accordance with various embodiments, at least one processor 21 may be implemented as a single integrated circuit (IC) or as multiple communicatively coupled IC's and/or discrete circuits. At least one processor 21 can be implemented in accordance with various known technologies.

In one embodiment, at least one processor 21 includes one or more circuits or units configurable to perform one or more data computing procedures or processes. For example, at least one processor 21 may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described below.

Application execution unit 30 can execute an application for wearable terminal 2.

Display 22 can show a result of execution by application execution unit 30. Representation control unit 28 can control representation on display 22.

Touch panel 23 can accept an input from a user. Input control unit 29 can control touch panel 23.

Since wearable terminal 2 is attached to a finger of the user, acceleration sensor 27 can output acceleration data representing movement of the finger of the user. Sensor control unit 32 can control an operation of acceleration sensor 27.

Memory 25 can store a first authentication ID.

Near field communicator 26 can communicate with portable terminal 1. Specifically, near field communicator 26 can transmit a first authentication ID stored in memory 25 to portable terminal 1 upon reception of an instruction from portable terminal 1. Near field communicator 26 can transmit the acceleration data output from acceleration sensor 27 to portable terminal 1 upon reception of an instruction from portable terminal 1. Near field communication control unit 31 can control an operation of near field communicator 26.

Portable terminal 1 includes a display 4, a touch panel 5, a memory 6, an antenna 7, a radio communicator 8, a near field communicator 10, and at least one processor 3. At least one processor 3 functions as a radio control unit 11, a representation control unit 12, an input control unit 13, a locking control unit 14, an application execution unit 16, and a near field communication control unit 17.

In accordance with various embodiments, at least one processor 3 may be implemented as a single integrated circuit (IC) or as multiple communicatively coupled IC's and/or discrete circuits. At least one processor 3 can be implemented in accordance with various known technologies.

In one embodiment, at least one processor 3 includes one or more circuits or units configurable to perform one or more data computing procedures or processes. For example, at least one processor 3 may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described below.

Application execution unit 16 can execute various applications.

Display 4 can show a result of execution by application execution unit 16. Representation control unit 12 can control representation on display 4.

Touch panel 5 can accept an input from a user. Input control unit 13 can control touch panel 5. Touch panel 5 can detect contact or proximity of an object (a finger of a user or a pen) in accordance with a capacitance.

Radio communicator 8 can establish radio communication with a not-shown radio base station through antenna 7.

Memory 6 can store a second authentication ID. Memory 6 can store data representing transition of positions of input onto touch panel 5 for unlocking.

Near field communicator 10 can communicate with wearable terminal 2. Specifically, near field communicator 10 can instruct wearable terminal 2 to transmit a first authentication ID and can receive the first authentication ID transmitted from wearable terminal 2 in response to the instruction. Near field communicator 10 can instruct wearable terminal 2 to transmit acceleration data and can receive the acceleration data transmitted from wearable terminal 2 in response to the instruction.

Locking control unit 14 can set and cancel locking.

When a user does not operate touch panel 5 for a certain time period, when a user operates a button for turning off the screen of display 4, or when a user indicates locking by touching a lock icon, locking control unit 14 can have display 4 show a lock screen by means of representation control unit 12 and can set locking.

Locking control unit 14 can accept no input onto touch panel 5 from a user except for input for unlocking while locking has been set.

In a locked state, however, an operation for an emergency call (to telephone numbers 110, 119, and 116 in Japan and 911 in the United States) can be performed in order to permit placement of an emergency telephone call without unlocking. A limited function may be activated without unlocking. For example, only a camera function may be activated with a prescribed operation. Without being limited to a camera, on/off of an airplane mode may be controlled.

Locking control unit 14 can compare a second authentication ID stored in memory 6 with a first authentication ID sent from wearable terminal 2. Locking control unit 14 can determine that authentication is successful when a result of comparison indicates match.

Locking control unit 14 can cancel locking when authentication is successful and when a correct input for unlocking is given onto touch panel 5 with a finger to which wearable terminal 2 is attached while the locking function has been set. When locking control unit 14 receives acceleration data representing movement of a finger from wearable terminal 2, it can control unlocking based on the received acceleration data and data representing a touch position on touch panel 5.

An unlocking method will further specifically be described below.

Figure 2:
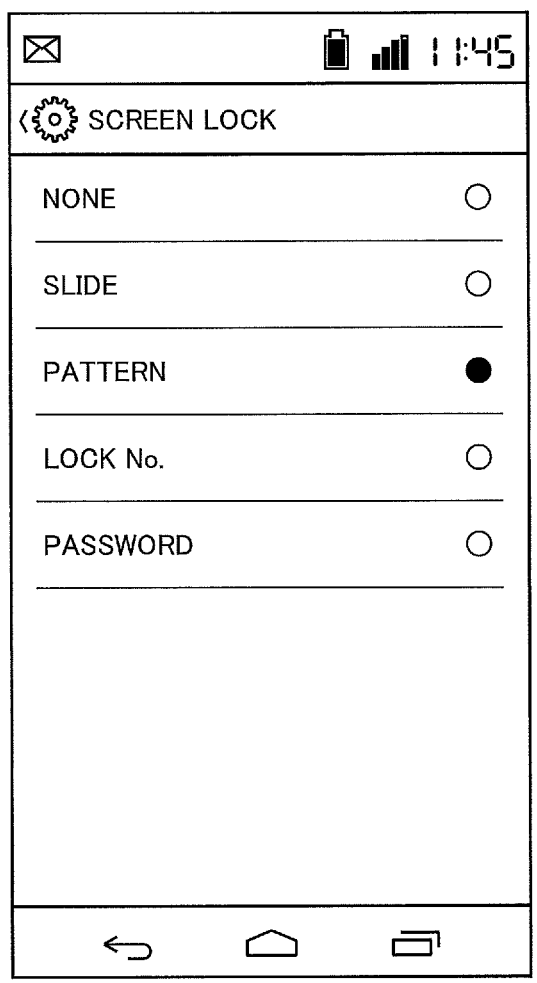
FIG. 2 is a diagram showing a screen for setting an unlocking scheme in an embodiment.

FIG. 2 is a diagram showing a screen for setting an unlocking scheme in an embodiment.

A user can set by which means locking should be canceled, among "slide" to perform a slide operation, a "pattern" to perform an operation to enter a pattern set and registered in advance, a "lock No." to perform an operation to enter a lock No. set and registered in advance, and a "password" to perform an operation to enter a password set and registered in advance.

Since the "pattern" is selected in the example in FIG. 2, the user can cancel locking by entering a pattern set and registered in advance.

Figure 3:
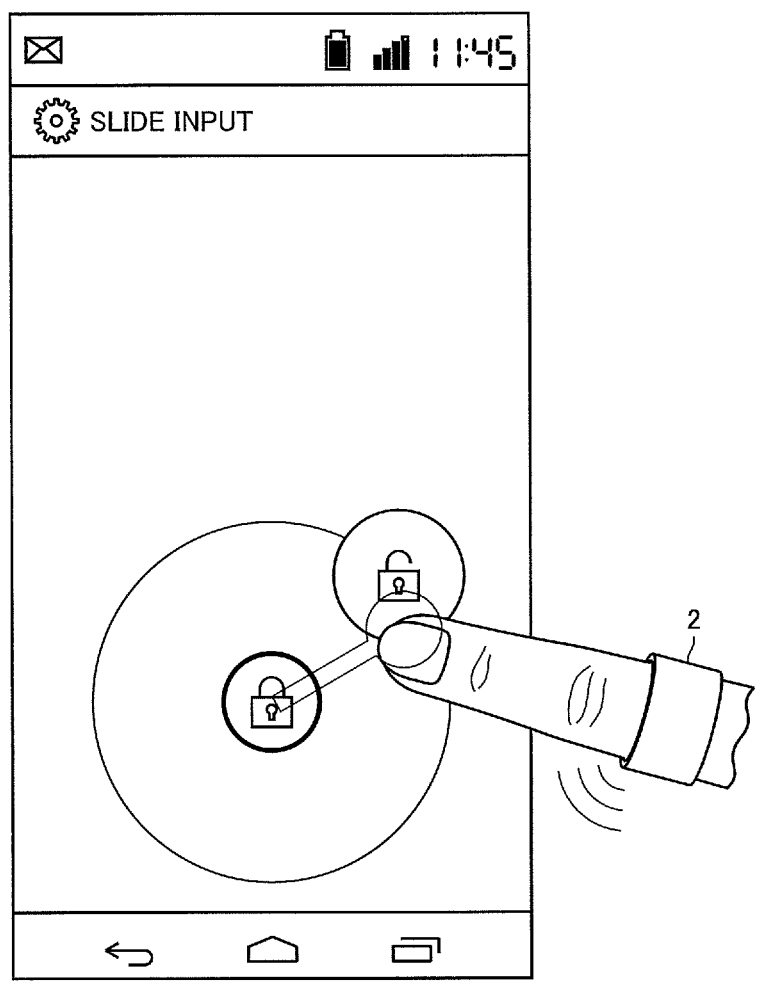
FIG. 3 is a diagram showing an example of unlocking by using slide.

FIG. 3 is a diagram showing an example of unlocking by using slide.

As shown in FIG. 3, when "slide" is set as an unlocking scheme, the user can cancel locking by performing a slide operation (sliding a finger in any direction).

When transition of touch positions on touch panel 5 represents movement of a finger, transition of positions of wearable terminal 2 specified by acceleration data representing movement of a finger represents movement of the finger, and movements of the fingers match with each other, locking control unit 14 can cancel locking.

Figure 4:
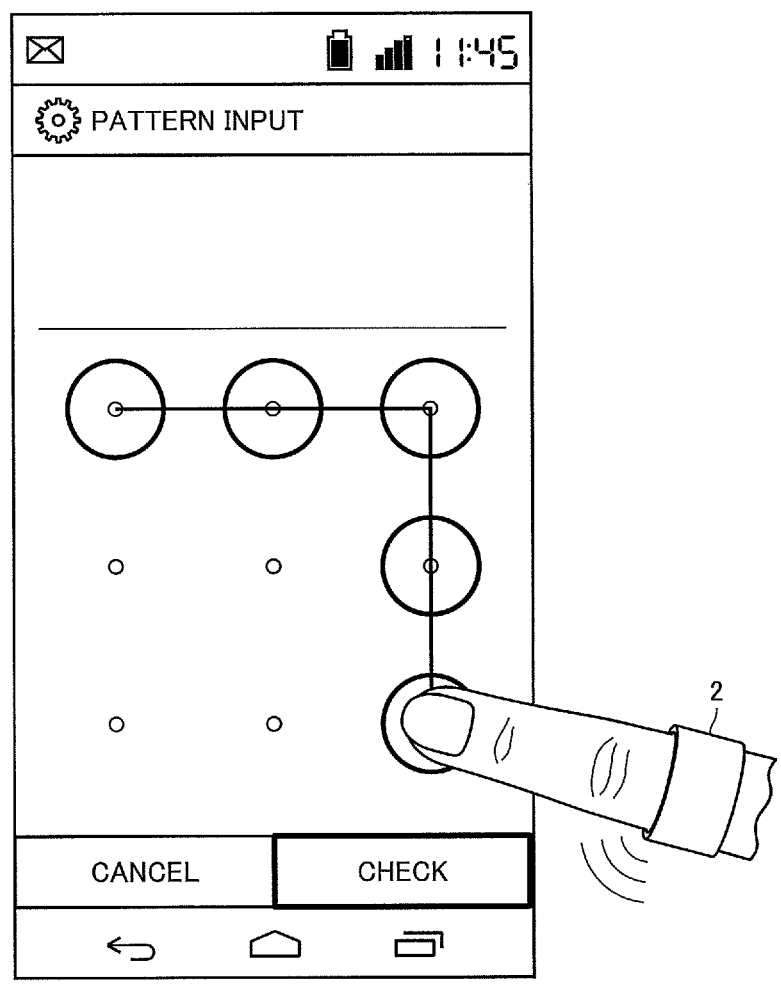
FIG. 4 is a diagram showing an example of unlocking by using a pattern.

FIG. 4 is a diagram showing an example of unlocking by using a pattern.

As shown in FIG. 4, when a "pattern" is set as an unlocking scheme, the user cancels locking by entering a pattern set and registered in advance (tracing some or all of nine shown dots with a finger).

When the "pattern" is set as the unlocking scheme, the user sets the pattern by moving a finger over touch panel 5. Consequently, memory 6 stores data representing transition of positions on touch panel 5 representing the set pattern.

When a similarity between transition of the touch positions on touch panel 5 and transition of positions on touch panel 5 stored in memory 6 is equal to or greater than a prescribed value and when a similarity between transition of positions of wearable terminal 2 specified by acceleration data representing movement of the finger and transition of positions on touch panel 5 stored in memory 6 is equal to or greater than a prescribed value, locking control unit 14 can cancel locking. For example, a mean square error can be employed as the similarity.

Figure 5:
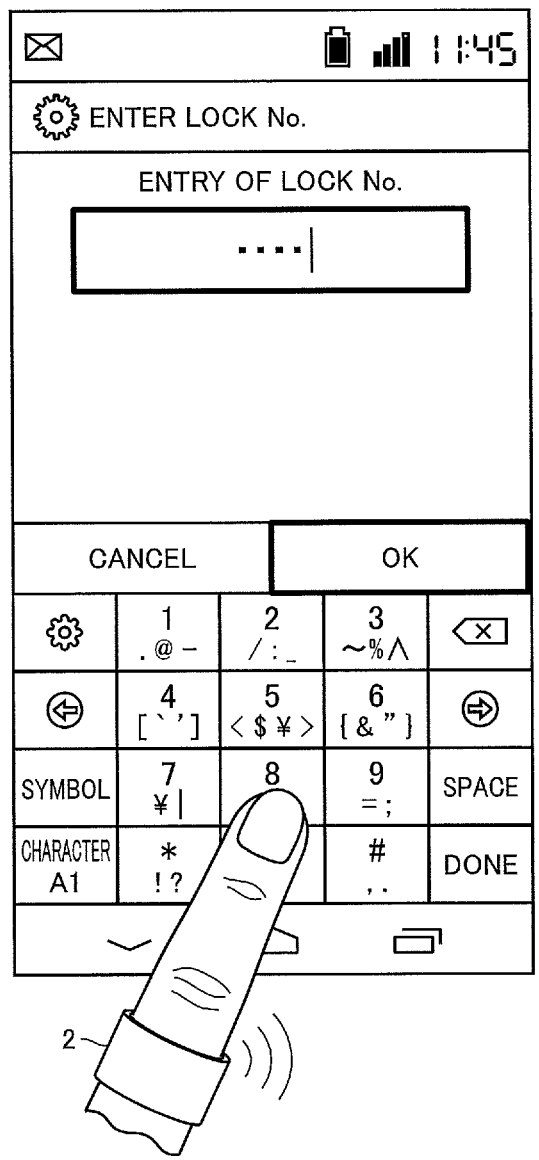
FIG. 5 is a diagram showing an example of unlocking by using a lock No.

FIG. 5 is a diagram showing an example of unlocking by using a lock No.

As shown in FIG. 5, when a "lock No." is set as an unlocking scheme, the user cancels locking by entering a lock No. consisting of a four-digit number set and registered in advance.

When a "lock No." is set as the unlocking scheme, the user sets a lock No. by moving his/her finger over touch panel 5 in a numeric input key area. Consequently, memory 6 stores the four-digit number representing the set lock No.

Locking control unit 14 can specify the input four-digit number based on transition of touch positions on touch panel 5. Locking control unit 14 can specify the input four-digit number based on transition of positions of wearable terminal 2 specified by acceleration data representing movement of a finger.

When the four-digit number specified by touching onto touch panel 5 matches with the four-digit number stored in memory 6 and when the four-digit number specified by acceleration data matches with the four-digit number stored in memory 6, locking control unit 14 can cancel locking. For example, a mean square error can be employed as the similarity.

Figure 6:
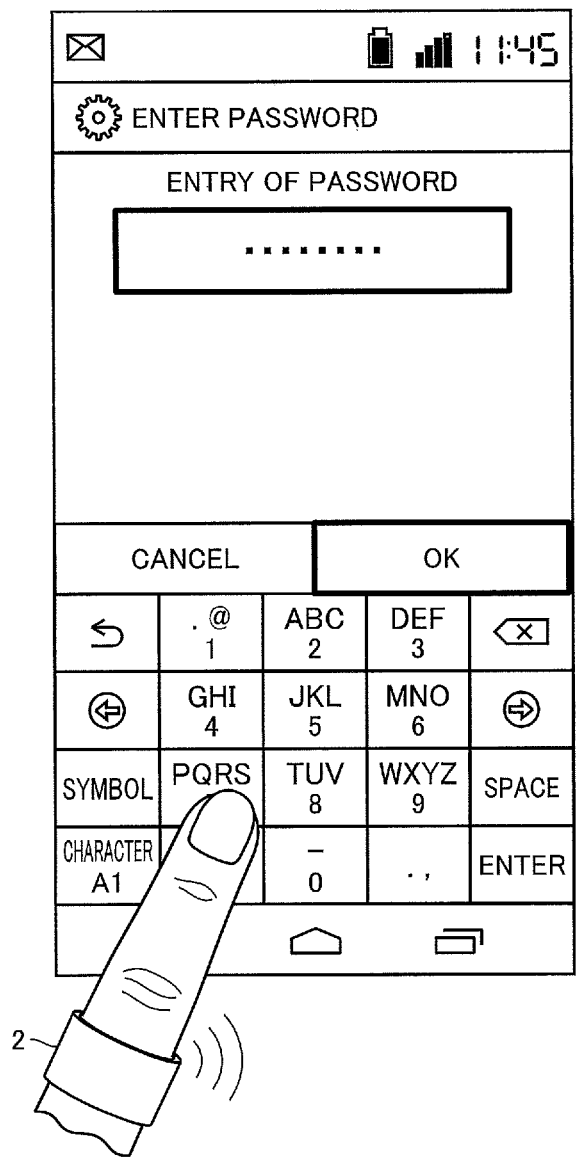
FIG. 6 is a diagram showing an example of unlocking by using a password.

FIG. 6 is a diagram showing an example of unlocking by using a password.

As shown in FIG. 6, when a "password" is set as an unlocking scheme, the user cancels locking by entering a password consisting of characters or numbers of any digits set and registered in advance.

When a "password" is set as the unlocking scheme, the user can set a password by moving his/her finger over touch panel 5 in a character input key area. Consequently, memory 6 can store characters or numbers of any digits representing the set password.

Locking control unit 14 can specify the input characters or numbers of any digits based on transition of touch positions on touch panel 5. Locking control unit 14 can specify the input characters or numbers of any digits based on transition of positions of wearable terminal 2 specified by acceleration data representing movement of a finger.

When the characters or numbers of any digits specified by touching onto touch panel 5 match with the characters or numbers of any digits stored in memory 6 and when the characters or numbers of any digits specified by acceleration data match with the characters or numbers of any digits stored in memory 6, locking control unit 14 can cancel locking. For example, a mean square error can be employed as the similarity.

Figure 7:
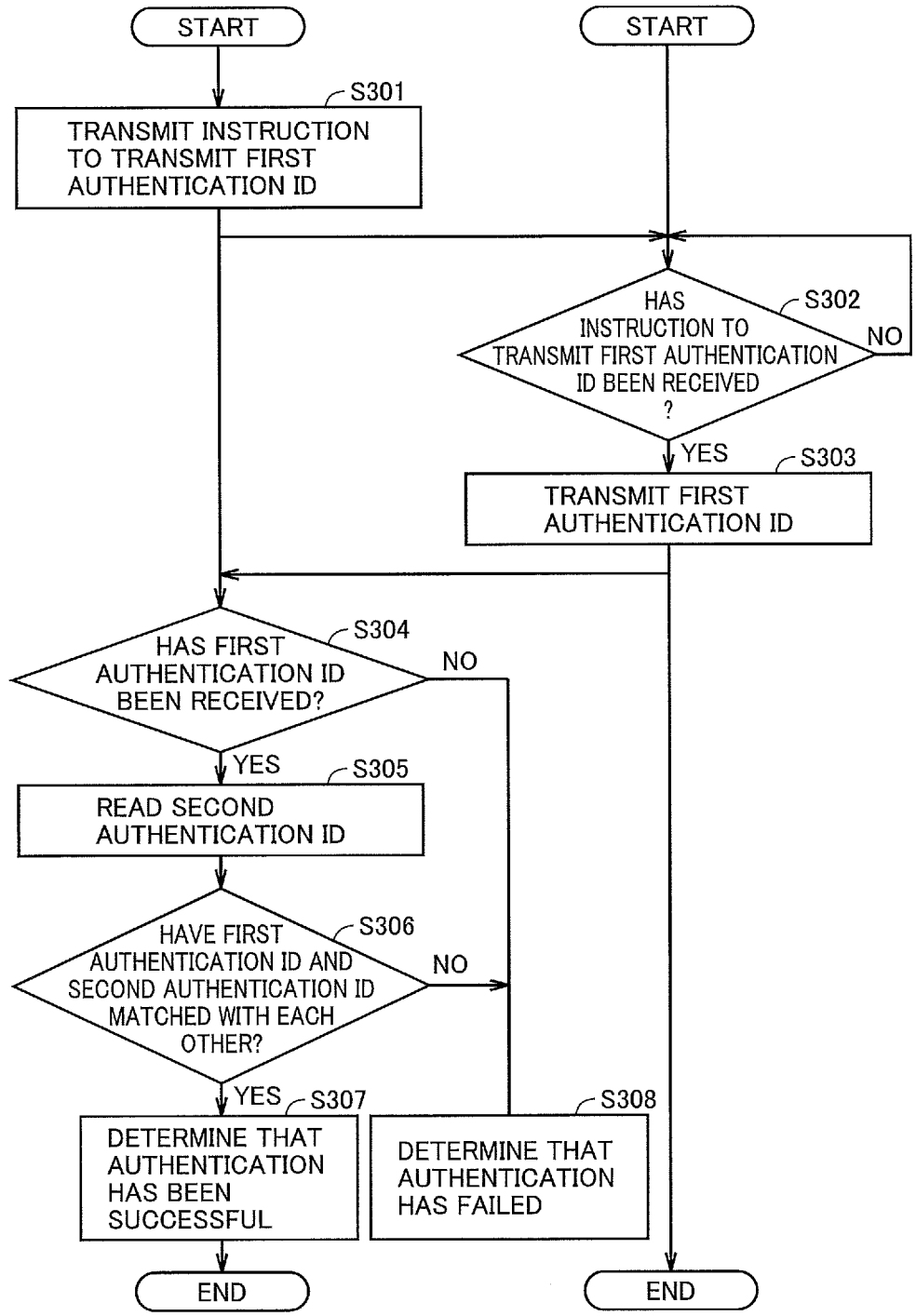
FIG. 7 is a flowchart showing a sequence of an authentication procedure between the portable terminal and the wearable terminal.

FIG. 7 is a flowchart showing a sequence of an authentication procedure between portable terminal 1 and wearable terminal 2.

In step S301, locking control unit 14 of portable terminal 1 can instruct wearable terminal 2 to transmit a first authentication ID through near field communicator 10.

When near field communicator 26 of wearable terminal 2 receives the instruction to transmit the first authentication ID in step S302, the process proceeds to step S303.

In step S303, near field communicator 26 of wearable terminal 2 can transmit the first authentication ID stored in memory 25.

When locking control unit 14 of portable terminal 1 has received the first authentication ID from wearable terminal 2 through near field communicator 10 within a prescribed time period in step S304, the process proceeds to step S305. When the locking control unit has not received the first authentication ID within the prescribed time period, the process proceeds to S308.

In step S305, locking control unit 14 of portable terminal 1 can read a second authentication ID stored in memory 6.

In step S306, locking control unit 14 of portable terminal 1 can compare the received first authentication ID with the read second authentication ID. When a result of comparison indicates match, the process proceeds to step S307, and when the result indicates unmatch, the process proceeds to step S308.

In step S307, locking control unit 14 of portable terminal 1 can determine that wearable terminal 2 has successfully been authenticated.

In step S308, locking control unit 14 of portable terminal 1 can determine that authentication of wearable terminal 2 has not been successful (failed).

Figure 8:
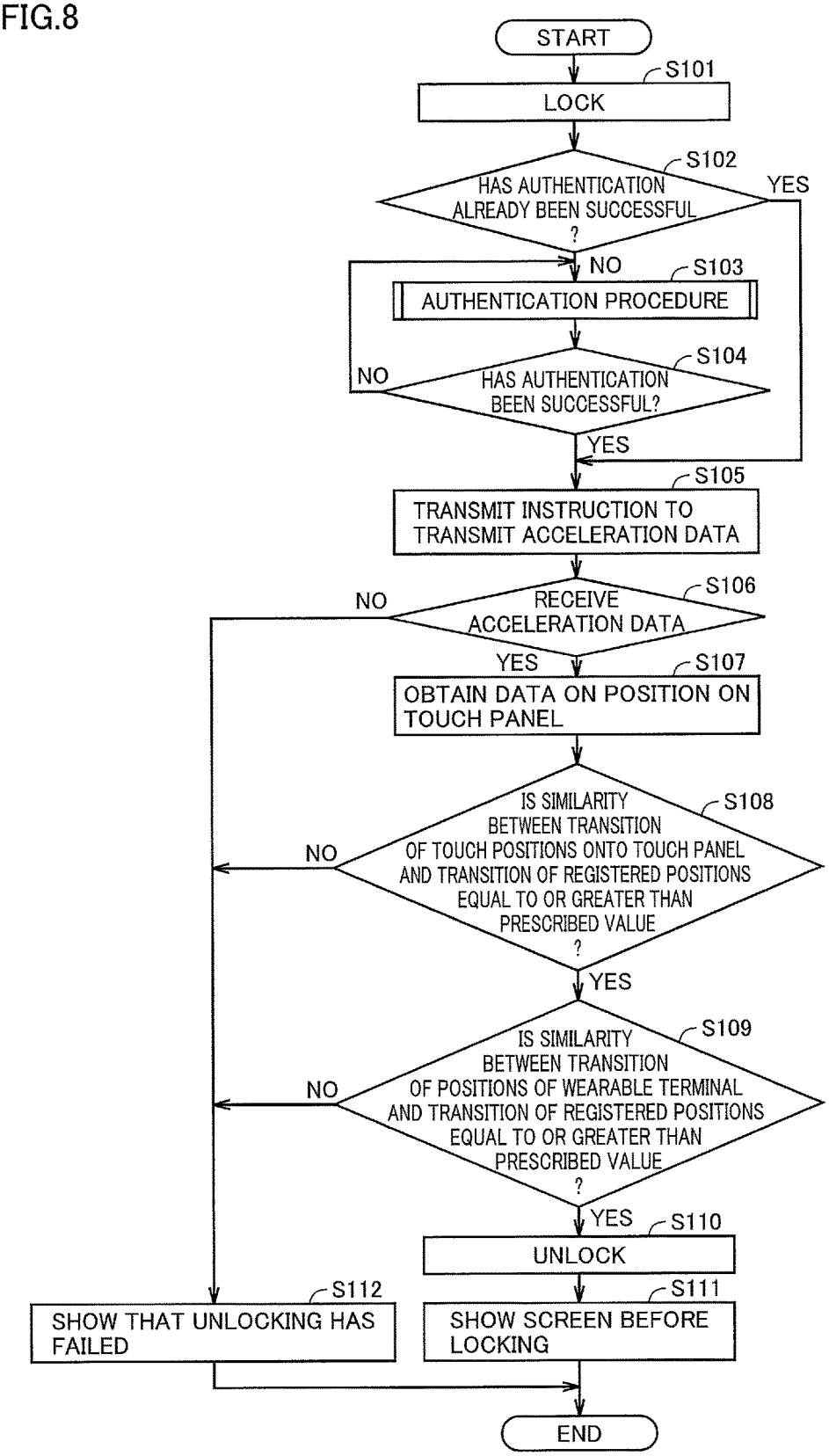
FIG. 8 is a flowchart showing a procedure for setting and canceling a locking function in a first embodiment.

FIG. 8 is a flowchart showing a procedure for setting and canceling locking in a first embodiment.

Initially, when a user does not operate touch panel 5 for a certain time period, when a user operates a button to turn off the screen of display 4, or a user indicates locking by touching a lock icon in step S101, locking control unit 14 of portable terminal 1 can have display 4 show a lock screen by means of representation control unit 12 and can set locking.

When wearable terminal 2 has already successfully been authenticated in step S102, the process proceeds to step S105, and when authentication of wearable terminal 2 has not yet been successful, the process proceeds to step S103.

In step S103, locking control unit 14 of portable terminal 1 can have the procedure for authenticating wearable terminal 2 in FIG. 7 performed.

When wearable terminal 2 has successfully been authenticated in step S104, the process proceeds to step S105, and when wearable terminal 2 has not successfully been authenticated, the process returns to step S103.

In step S105, locking control unit 14 of portable terminal 1 can instruct wearable terminal 2 to transmit acceleration data output from acceleration sensor 27 of wearable terminal 2 through near field communicator 10. Near field communicator 26 of wearable terminal 2 can receive the instruction to transmit acceleration data and can transmit the acceleration data output from acceleration sensor 27 to portable terminal 1.

When locking control unit 14 of portable terminal 1 receives in step S106 the acceleration data from wearable terminal 2 through near field communicator 10, the process proceeds to step S107. When locking control unit 14 of portable terminal 1 has not received acceleration data, the process proceeds to step S112.

In step S107, locking control unit 14 of portable terminal 1 can obtain position data representing a touch position onto touch panel 5.

When a similarity between transition of touch positions onto touch panel 5 shown by the obtained data representing touch positions onto touch panel 5 and transition of positions on touch panel 5 shown by data for unlocking recorded in memory 6 is equal to or greater than a prescribed value in step S108, the process proceeds to step S109. When the similarity is smaller than the prescribed value, the process proceeds to step S112.

When a similarity between transition of positions of wearable terminal 2 shown by the received acceleration data and transition of positions on touch panel 5 shown by the data for unlocking recorded in memory 6 is equal to or greater than a prescribed value, the process proceeds to step S110. When the similarity is smaller than the prescribed value, the process proceeds to step S112. In step S109, acceleration data received during a period from start until end of touching onto touch panel 5 is used.

In step S110, locking control unit 14 of portable terminal 1 can cancel locking.

In step S111, locking control unit 14 of portable terminal 1 can have display 4 show a screen before locking by means of representation control unit 12.

In step S110, locking control unit 14 of portable terminal 1 can have display 4 show a screen including a message that unlocking has failed by means of representation control unit 12.

As set forth above, according to the first embodiment, when a user who operates a portable terminal is not wearing a wearable terminal, acceleration data from the wearable terminal cannot be obtained or movement of a finger of the user shown by the acceleration data of wearable terminal 2 is different from movement of a finger for touching the touch panel. By making use of such a feature, a portable terminal can be prevented from being fraudulently unlocked.

Second Embodiment

In a second embodiment, an unlocking scheme employed at the time when a user operates touch panel 5 while he/she wears wearable terminal 2 and an unlocking scheme employed at the time when the user operates touch panel 5 without wearing wearable terminal 2 are different from each other.

When locking control unit 14 has received acceleration data from wearable terminal 2 while locking has been set, the locking control unit can control unlocking under a first unlocking scheme lower in security level based on received acceleration data representing movement of a finger and data representing a touch position onto touch panel 5.

When locking control unit 14 has not received acceleration data from wearable terminal 2 while locking has been set, the locking control unit can control unlocking under a second unlocking scheme higher in security level based on data representing a touch position onto touch panel 5.

When the security level is high, the number of options with which locking is canceled is small with respect to the number of options for user input. When the security level is low, the number of options with which locking is canceled is great with respect to the number of options for user input.

For example, when a lock No. consists of a four-digit number, under an unlocking scheme based on a lock No., the number of options for user input is 10,000 ($=10 \times 10 \times 10 \times 10$) whereas the number of options with which locking is canceled is 1.

When a password consists of characters or numbers of any digits from one to six and there are 26 types of characters and 10 types of numbers, under an unlocking scheme based on a password, the number of options for user input is approximately two billion and two thousand million ($\approx 36+36^2+36^3+36^4+36^5+36^6$) and the number of options with which locking is canceled is 1.

When a pattern is subject to the condition that at least four dots among nine dots should be connected and one dot can be connected only once, under an unlocking scheme based on the pattern, the number of options for user input is approximately one hundred forty thousand and the number of options with which locking is canceled is 1.

Under an unlocking scheme by using slide, a user may move his/her finger in any direction. Therefore, all options which can be selected by the user are options with which locking is canceled.

Therefore, in the second embodiment, the security level increases in the order of slide, the lock No., the pattern, and the password.

FIG. 9 is a diagram showing an exemplary combination of a first unlocking scheme and a second unlocking scheme in the second embodiment.

As shown in FIG. 9, a slide operation low in security level is set as the first unlocking scheme and a pattern input operation higher in security level is set as the second unlocking scheme.

In the second embodiment, a screen shown when the user cancels locking while he/she is wearing wearable terminal 2 and a screen shown when the user cancels locking without wearing wearable terminal 2 are different from each other.

FIG. 10 is a diagram showing an exemplary combination of a screen shown after unlocking under the first unlocking scheme and a screen shown after unlocking under the second unlocking scheme in the second embodiment.

As shown in FIG. 10, after unlocking under the first unlocking scheme, a screen before locking is shown, so that the user can continue an operation which he/she has been performing before locking.

After unlocking under the second unlocking scheme, a home screen is shown.

The home screen is a screen from which a user operation starts. The home screen may also be called a desktop, a stand-by screen, a standard screen, and an application list screen. If locking is canceled without wearable terminal 2 being worn, a person (a third party) other than an owner of portable terminal 1 may have canceled locking. If a screen before locking is shown, an operation which has been performed by the owner of portable terminal 1 before locking may be known by others.

Figure 11:
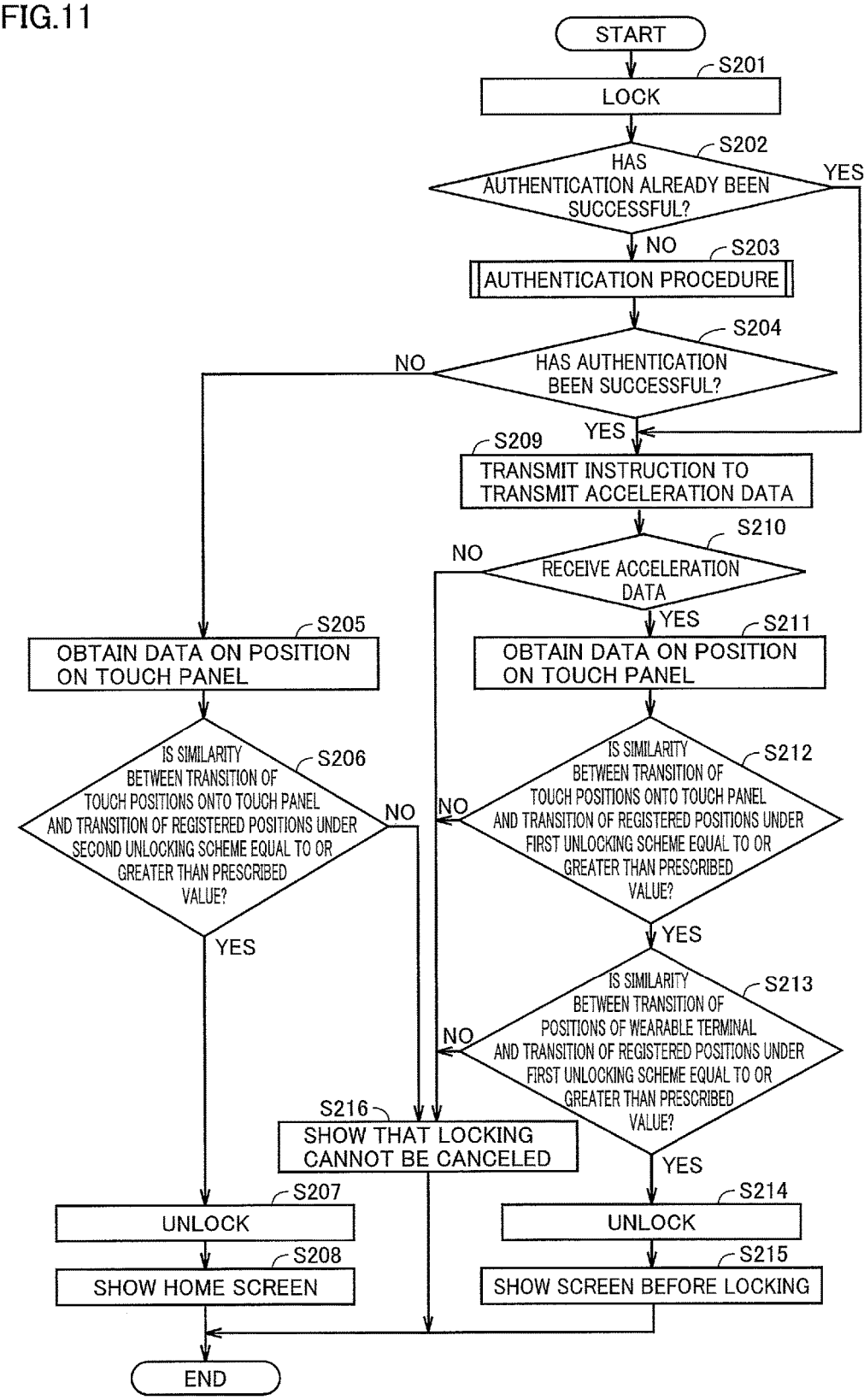
FIG. 11 is a flowchart showing a procedure for setting and canceling the locking function in the second embodiment.

FIG. 11 is a flowchart showing a procedure for setting and canceling locking in the second embodiment.

Initially, when the user does not operate touch panel 5 for a certain time period, when the user operates a button to turn off the screen on display 4, or when the user indicates locking by touching a lock icon, locking control unit 14 of portable terminal 1 can have display 4 show a lock screen by means of representation control unit 12 and set locking in step S201.

When wearable terminal 2 has already successfully been authenticated in step S202, the process proceeds to step S209, and when wearable terminal 2 has not successfully been authenticated, the process proceeds to step S203.

In step S203, locking control unit 14 of portable terminal 1 can have the procedure for authentication of wearable terminal 2 in FIG. 7 performed.

When wearable terminal 2 has successfully been authenticated in step S204, the process proceeds to step S209, and when wearable terminal 2 has not successfully been authenticated, the process proceeds to step S205.

In step S205, locking control unit 14 of portable terminal 1 can obtain position data representing a touch position on touch panel 5.

When a similarity between transition of positions of input onto touch panel 5 shown with the obtained position data representing touch positions onto touch panel 5 and transition of positions on touch panel 5 shown with data for unlocking under the second unlocking scheme recorded in memory 6 is equal to or greater than a prescribed value in step S206, the process proceeds to step S207. When the similarity is smaller than the prescribed value, the process proceeds to step S216.

In step S207, locking control unit 14 of portable terminal 1 can cancel locking.

Figure 12:
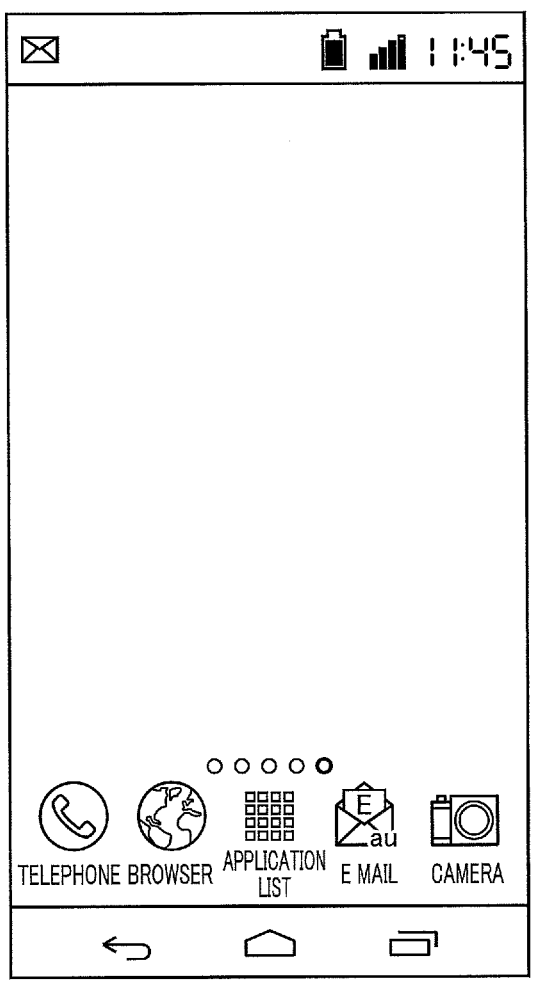
FIG. 12 is a diagram showing an exemplary screen shown after unlocking under the first unlocking scheme.

In step S208, locking control unit 14 of portable terminal 1 can have display 4 show the home screen as shown in FIG. 12 by means of representation control unit 12.

In step S209, locking control unit 14 of portable terminal 1 can instruct wearable terminal 2 to transmit acceleration data output from acceleration sensor 27 of wearable terminal 2 through near field communicator 10. Near field communicator 26 of wearable terminal 2 can receive the instruction to transmit acceleration data and can transmit the acceleration data output from acceleration sensor 27 to portable terminal 1.

When locking control unit 14 of portable terminal 1 has received the acceleration data from wearable terminal 2 through near field communicator 10 in step S210, the process proceeds to step S211. When locking control unit 14 of portable terminal 1 has not received the acceleration data, the process proceeds to step S216.

In step S211, locking control unit 14 of portable terminal 1 can obtain position data representing a touch position onto touch panel 5.

When a similarity between transition of positions of input onto touch panel 5 shown with the obtained data representing touch positions onto touch panel 5 and transition of positions on touch panel 5 shown with the data for unlocking under the first unlocking scheme recorded in memory 6 is equal to or greater than a prescribed value in step S212, the process proceeds to step S213. When the similarity is smaller than the prescribed value, the process proceeds to step S216.

When a similarity between transition of positions of wearable terminal 2 shown with the received acceleration data and transition of positions on touch panel 5 shown with the data for unlocking under the first unlocking scheme recorded in memory 6 is equal to or greater than a prescribed value in step S213, the process proceeds to step S214. When the similarity is smaller than the prescribed value, the process proceeds to step S216. In step S213, acceleration data received during a period from start to end of touch onto touch panel 5 is used.

In step S214, locking control unit 14 of portable terminal 1 can cancel locking.

Figure 13:
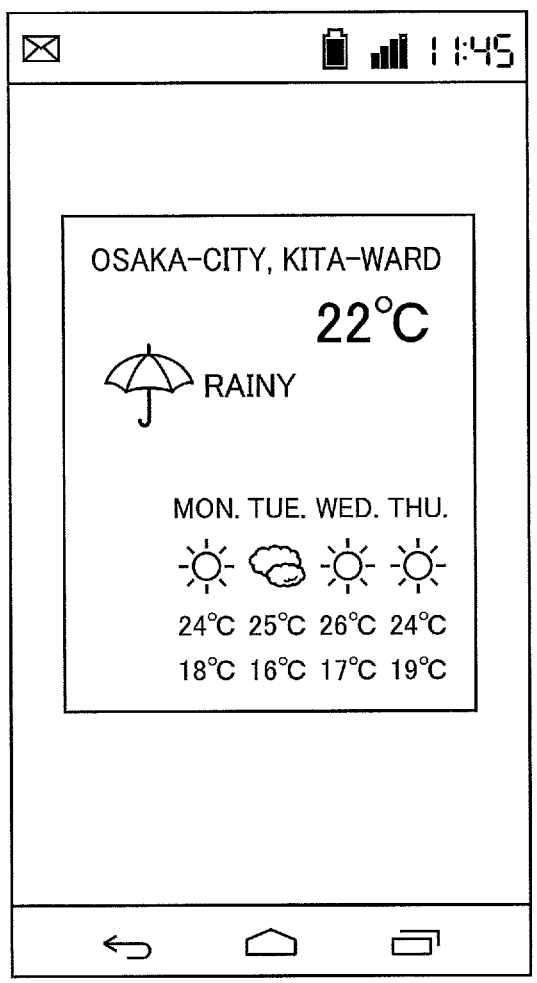
FIG. 13 is a diagram showing an exemplary screen shown after unlocking under the second unlocking scheme.

In step S215, locking control unit 14 of portable terminal 1 can have display 4 show the screen before locking as shown in FIG. 13 by means of representation control unit 12.

In step S216, locking control unit 14 of portable terminal 1 can have display 4 show a screen including a message that unlocking has failed by means of representation control unit 12.

As set forth above, according to the second embodiment, when a user who operates a portable terminal is not wearing a wearable terminal, locking cannot be canceled without using an unlocking scheme high in security level. Thus, a portable terminal can be prevented from being fraudulently unlocked.

For example, the second embodiment is particularly effective for an example in which a third party watches a user himself/herself operating a wearable terminal with the wearable terminal being worn by the user and the third party intentionally attempts unlocking by following the user's example. This is because locking will not be canceled even if the third party performs processing as performed by the user (an unlocking operation). Thus, even when an unlocking operation by a user is watched by a third party, the third party cannot easily cancel locking.

First Modification of Second Embodiment

The first unlocking scheme and the second unlocking scheme are not limited to those shown in FIG. 9.

FIGS. 14A to 14K are diagrams showing modifications of the combination of the first unlocking scheme and the second unlocking scheme.

As shown in FIG. 14A, a slide operation may be set as the first unlocking scheme and a lock No. input operation may be set as the second unlocking scheme.

As shown in FIG. 14B, a slide operation may be set as the first unlocking scheme and a password input operation may be set as the second unlocking scheme.

As shown in FIG. 14C, a lock No. input operation may be set as the first unlocking scheme and a pattern input operation may be set as the second unlocking scheme.

As shown in FIG. 14D, a lock No. input operation may be set as the first unlocking scheme and a password input operation may be set as the second unlocking scheme.

As shown in FIG. 14E, a pattern input operation may be set as the first unlocking scheme and a password input operation may be set as the second unlocking scheme.

As shown in FIG. 14F, a slide operation may be set as the first unlocking scheme and a slide operation and a lock No. input operation may be set as the second unlocking scheme. Under the second unlocking scheme, locking cannot be canceled unless a lock No. is further entered after a slide operation is performed.

As shown in FIG. 14G, a slide operation may be set as the first unlocking scheme and a slide operation and a pattern input operation may be set as the second unlocking scheme. Under the second unlocking scheme, locking cannot be canceled unless a pattern is further entered after a slide operation is performed.

As shown in FIG. 14H, a slide operation may be set as the first unlocking scheme and a slide operation and a password input operation may be set as the second unlocking scheme. Under the second unlocking scheme, locking cannot be canceled unless a password is further entered after a slide operation is performed.

As shown in FIG. 14I, a lock No. input operation may be set as the first unlocking scheme and a lock No. input operation and a pattern input operation may be set as the second unlocking scheme. Under the second unlocking scheme, locking cannot be canceled unless a pattern is further entered after a lock No. is entered.

As shown in FIG. 14J, a lock No. input operation may be set as the first unlocking scheme and a lock No. input operation and a password input operation may be set as the second unlocking scheme. Under the second unlocking scheme, locking cannot be canceled unless a password is further entered after a lock No. is entered.

As shown in FIG. 14K, a pattern input operation may be set as the first unlocking scheme and a pattern input operation and a password input operation may be set as the second unlocking scheme. Under the second unlocking scheme, locking cannot be canceled unless a password is further entered after a pattern is entered.

In addition to the above, any combination is acceptable so long as the first unlocking scheme is lower in security level and the second unlocking scheme is higher in security level. For example, a slide operation may be set as the first unlocking scheme and a lock No. input operation, a pattern input operation, and a password input operation may be set as the second unlocking scheme.

Second Modification of Second Embodiment

A screen shown after unlocking under the first unlocking scheme and a screen shown after unlocking under the second unlocking scheme are not limited to those shown in FIG. 10.

FIGS. 15A to 15J are diagrams showing modifications of the combination of a screen shown after unlocking under the first unlocking scheme and a screen shown after unlocking under the second unlocking scheme.

As shown in FIG. 15A, a screen highest in frequency of use may be shown after unlocking under the first unlocking scheme and the home screen may be shown after unlocking under the second unlocking scheme.

As shown in FIG. 15B, a screen associated with an event may be shown after unlocking under the first unlocking scheme, and the home screen may be shown after unlocking under the second unlocking scheme. The event means reception of a mail, an incoming call, reception of a message over Line, or launch of an application in accordance with a predetermined schedule.

As shown in FIG. 15C, when a plurality of events occur after unlocking under the first unlocking scheme, a screen associated with an event highest in priority may be shown, and the home screen may be shown after unlocking under the second unlocking scheme. The priority can be predetermined by a user.

A shown in FIG. 15D, when a plurality of events occur after unlocking under the first unlocking scheme, a screen associated with an event which occurs earliest may be shown, and the home screen may be shown after unlocking under the second unlocking scheme.

As shown in FIG. 15E, when a plurality of events occur after unlocking under the first unlocking scheme, a screen associated with an event which occurs last may be shown, and the home screen may be shown after unlocking under the second unlocking scheme.

As shown in FIG. 15F, a screen highest in frequency of use may be shown after unlocking under the first unlocking scheme, and a screen before locking may be shown after unlocking under the second unlocking scheme.

As shown in FIG. 15G, a screen associated with an event may be shown after unlocking under the first unlocking scheme, and a screen before locking may be shown after unlocking under the second unlocking scheme.

As shown in FIG. 15H, when a plurality of events occur after unlocking under the first unlocking scheme, a screen associated with an event highest in priority may be shown, and a screen before locking may be shown after unlocking under the second unlocking scheme.

As shown in FIG. 15I, when a plurality of events occur after unlocking under the first unlocking scheme, a screen associated with an event which occurs earliest may be shown, and a screen before locking may be shown after unlocking under the second unlocking scheme.

As shown in FIG. 15J, when a plurality of events occur after unlocking under the first unlocking scheme, a screen associated with an event which occurs last may be shown, and a screen before locking may be shown after unlocking under the second unlocking scheme.

Third Modification of Second Embodiment

Though the home screen is shown without exception after unlocking under the second unlocking scheme in the second embodiment, limitation thereto is not intended.

When a scheme for nth unlocking is the second unlocking scheme, whether to show the home screen or the screen before locking may be changed in accordance with a scheme for (n−1)th unlocking.

When a scheme for (n−1)th unlocking is the first unlocking scheme, the home screen is shown after nth unlocking under the second unlocking scheme. When a scheme for (n−1)th unlocking is the second unlocking scheme, however, after nth unlocking under the second unlocking scheme, a screen before nth locking may be shown.

According to such a configuration, for example, when an authorized user who is accidentally not wearing wearable terminal 2 successively attempts (n−1)th and nth unlocking under the second unlocking scheme, the screen before nth locking is shown after nth unlocking under the second unlocking scheme so that usability for the user is improved.

(Modification as a Whole)

The present disclosure is not limited to embodiments above. For example, the present disclosure also includes modifications as below.

(1) Wearable Terminal

Though a wearable terminal has been described as a ring type device in embodiments, limitation thereto is not intended and the wearable terminal may be, for example, a watch type device.

(2) Authentication Procedure

Though a procedure for authentication of a wearable terminal is performed at any timing before locking and at timing immediately after locking in embodiments, limitation thereto is not intended.

The procedure for authentication may be performed only immediately after locking.

Figure 16:
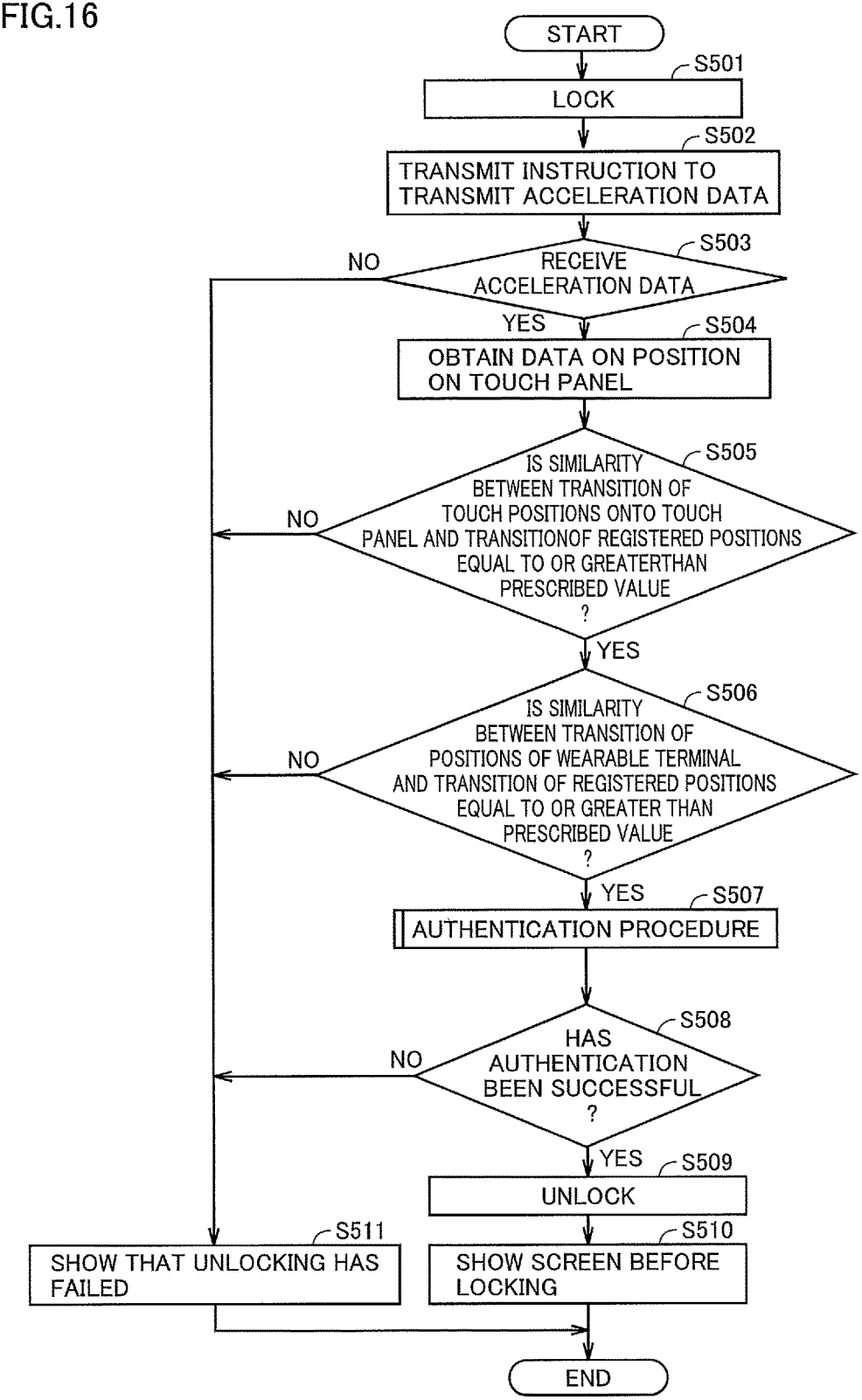
FIG. 16 is a flowchart showing a procedure for setting and canceling locking in a modification.

Alternatively, as shown in a flowchart in FIG. 16, locking may be set, an acceleration may thereafter be detected, a series of processes may be performed, and thereafter a procedure for authentication may finally be performed.

FIG. 16 is a flowchart showing a procedure for setting and canceling locking in a modification.

Initially, when the user does not operate touch panel 5 for a certain time period, when the user operates a button to turn off the screen on display 4, or when the user indicates locking by touching a lock icon, locking control unit 14 of portable terminal 1 can have display 4 show a lock screen by means of representation control unit 12 and set locking in step S501.

In step S502, locking control unit 14 of portable terminal 1 can instruct wearable terminal 2 to transmit acceleration data output from acceleration sensor 27 of wearable terminal 2 through near field communicator 10. Near field communicator 26 of wearable terminal 2 can receive the instruction to transmit acceleration data and can transmit the acceleration data output from acceleration sensor 27 to portable terminal 1.

When locking control unit 14 of portable terminal 1 has received the acceleration data from wearable terminal 2 through near field communicator 10 in step 503, the process proceeds to step S504. When locking control unit 114 of portable terminal 1 has not received the acceleration data, the process proceeds to step S511.

In step S504, locking control unit 14 of portable terminal 1 can obtain position data representing a touch position onto touch panel 5.

When a similarity between transition of touch positions onto touch panel 5 shown by the obtained data representing touch positions onto touch panel 5 and transition of positions on touch panel 5 shown by the data for unlocking recorded in memory 6 is equal to or greater than a prescribed value in step S505, the process proceeds to step S506. When the similarity is smaller than the prescribed value, the process proceeds to step S511.

When a similarity between transition of positions of wearable terminal 2 shown by the received acceleration data and transition of positions on touch panel 5 represented by the data for unlocking recorded in memory 6 is equal to or greater than a prescribed value in step S506, the process proceeds to step S507. When the similarity is smaller than the prescribed value, the process proceeds to step S511.

In step S507, locking control unit 14 of portable terminal 1 can have the procedure for authentication of wearable terminal 2 in FIG. 7 performed.

When wearable terminal 2 has successfully been authenticated in step S508, the process proceeds to step S509, and when wearable terminal 2 has not successfully been authenticated, the process proceeds to step S511.

In step S509, locking control unit 14 of portable terminal 1 can cancel locking.

In step S510, locking control unit 14 of portable terminal 1 can have display 4 show the screen before locking by means of representation control unit 12.

In step S511, locking control unit 14 of portable terminal 1 can have display 4 show a screen including a message that unlocking has failed by means of representation control unit 12.

Instead of the above, processing in steps S507 and S508 may be performed in parallel to processing in steps S504 to S506.

Though successful authentication of a wearable terminal is a precondition for permitting unlocking in embodiments, limitation thereto is not intended and a procedure for authentication of a wearable terminal does not have to be performed.

(3) Lock No. and Password

Though a touched character or number is specified based on detection of a touch position on touch panel 5 with an acceleration sensor in embodiments, limitation thereto is not intended.

A touched character or number may be detected based on the number of times of touch onto touch panel 5 and a relative direction of movement of a touched portion.

For example, when 1, 5, 6, and 9 are touched in a lock No. input screen in FIG. 5, the number of times of touch of 4 and movement to a lower right direction, a right direction, and a downward direction can be detected. Successive touch onto 1, 5, 6, and 9 can thus be detected.

Acceleration data obtained at the time when a user enters a specific lock No. or password may be recorded as it is and a touched character or number may be detected based on pattern matching with an entered acceleration pattern.

Steps S108 and S109 in FIG. 8 and steps S212 and S213 in FIG. 11 may be performed in a reverse order.

Once authentication for unlocking fails, a message that locking cannot be canceled is shown in embodiments (S112 and S216), however, the message may be shown when authentication fails a prescribed number of times.

(4) Acceleration Data

Though a wearable terminal detects acceleration and acceleration data is transmitted to a portable terminal in embodiments, limitation thereto is not intended and a wearable terminal may transmit other data showing movement of the wearable terminal to the portable terminal. For example, the wearable terminal may detect motion vectors of a hand or a finger of a user who holds a wearable terminal or of an object based on a detected acceleration and transmit the detected motion vectors to the portable terminal.

It should be understood that embodiments disclosed herein are illustrative and non-restrictive in every respect. The scope of the present disclosure is defined by the terms of the claims rather than the description above and is intended to include any modifications within the scope and meaning equivalent to the terms of the claims.

The invention claimed is:

1. A portable terminal capable of communicating with a wearable terminal, the wearable terminal being capable of transmitting data showing movement of the wearable terminal to the portable terminal, the portable terminal comprising:

a communicator configured to communicate with the wearable terminal;

at least one processor configured to set and cancel locking; and a touch panel configured to detect proximity or contact of an object, the communicator configured to receive the data showing movement of the wearable terminal from the wearable terminal, and when the communicator receives the data showing movement of the wearable terminal while locking has been set, the at least one processor being configured to unlock the portable terminal when a similarity between a transition of touch positions on the touch panel and a transition of positions stored in a memory is equal to or greater than a first prescribed value, and a similarity between a transition of positions of the wearable terminal and the transition of positions stored in a memory is equal to or greater than a second prescribed value, wherein the transition of touch positions on the touch panel occur simultaneously with the transition of positions of the wearable terminal, and wherein the transition of positions stored in the memory are set in advance by a user of the wearable terminal, wherein the at least one processor is further configured to control unlocking under a first unlocking scheme low in security level based on the received data showing movement of the wearable terminal and the data representing the position on the touch panel where proximity or contact has been detected when the communicator receives the data showing movement of the wearable terminal while locking has been set, and the at least one processor is further configured to control unlocking under a second unlocking scheme high in security level based on the data representing the position on the touch panel where proximity or contact has been detected when the communicator does not receive the data showing movement of the wearable terminal while locking has been set.

2. The portable terminal according to claim 1, wherein the wearable terminal includes an acceleration sensor,
the wearable terminal is configured to transmit acceleration data output from the acceleration sensor to the portable terminal as the data showing movement of the wearable terminal,
the communicator can receive the acceleration data transmitted from the wearable terminal, and
the at least one processor is configured to control unlocking based on the acceleration data and the data representing the position on the touch panel where proximity or contact has been detected when the communicator receives the acceleration data while locking has been set.

3. The portable terminal according to claim 1, wherein the at least one processor is configured to have a screen before locking shown when the communicator receives the data showing movement of the wearable terminal and locking is canceled under the first unlocking scheme.

4. The portable terminal according to claim 3, wherein the at least one processor is configured to have a home screen shown when locking is canceled under the second unlocking scheme without reception of the data showing movement of the wearable terminal by the communicator.

5. The portable terminal according to claim 1, wherein the at least one processor is configured to have a screen high in frequency of use shown when the communicator receives the data showing movement of the wearable terminal and locking is canceled under the first unlocking scheme.

6. The portable terminal according to claim 5, wherein the at least one processor is configured to have a home screen or a screen before locking shown when locking is canceled under the second unlocking scheme without reception of the data showing movement of the wearable terminal by the communicator.

7. The portable terminal according to claim 1, wherein the at least one processor is configured to have a screen associated with an event which occurs while locking has been set shown when the communicator receives the data showing movement of the wearable terminal and locking is canceled under the first unlocking scheme.

8. The portable terminal according to claim 7, wherein the at least one processor is configured to have a screen associated with an event highest in priority among a plurality of events that occur shown when a plurality of events occur while locking has been set.

9. The portable terminal according to claim 7, wherein the at least one processor is configured to have a screen associated with an event which occurs earliest among a plurality of events that occur shown when a plurality of events occur while locking has been set.

10. The portable terminal according to claim 7, wherein the at least one processor is configured to have a screen associated with an event which occurs last among a plurality of events that occur shown when a plurality of events occur while locking has been set.

11. The portable terminal according to claim 7, wherein the at least one processor is configured to have a home screen or a screen before locking shown when locking is canceled under the second unlocking scheme without reception of the data showing movement of the wearable terminal by the communicator.

12. The portable terminal according to claim 1, wherein the wearable terminal includes a ring type terminal.

13. The portable terminal according to claim 1, wherein the first unlocking scheme includes a slide operation, and the second unlocking scheme includes a pattern input operation.

14. A method of controlling locking in a portable terminal capable of communicating with a wearable terminal, the wearable terminal being capable of transmitting data showing movement of the wearable terminal to the portable terminal, the portable terminal including a touch panel configured to detect proximity or contact of an object, the method comprising:
the portable terminal setting locking;
the portable terminal receiving the data showing movement of the wearable terminal from the wearable terminal; and
the portable terminal controlling unlocking when a similarity between a transition of touch positions on the touch panel and a transition of positions stored in a memory is equal to or greater than a first prescribed value, and a similarity between a transition of positions of wearable terminal and the transition of positions stored in a memory is equal to or greater than a second prescribed value, wherein the transition of touch positions on the touch panel occur simultaneously with the transition of positions of the wearable terminal, and wherein the transition of positions stored in the memory are set in advance by a user of the wearable terminal; wherein
the portable terminal is further configured to control unlocking under a first unlocking scheme low in security level based on the received data showing movement of the wearable terminal and the data representing the position on the touch panel where proximity or contact has been detected when the communicator receives the data showing movement of the wearable terminal while locking has been set, and
the portable terminal is further configured to control unlocking under a second unlocking scheme high in security level based on the data representing the position on the touch panel where proximity or contact has been detected when the communicator does not receive the data showing movement of the wearable terminal while locking has been set.

* * * * *